US012528465B2

(12) United States Patent
Standley et al.

(10) Patent No.: US 12,528,465 B2
(45) Date of Patent: Jan. 20, 2026

(54) MOBILE DEVICE WITH ADAPTABLE SPEED FOR ASSISTING A USER

(71) Applicant: Toyota Motor Engineering & Manufacturing North America, Inc., Plano, TX (US)

(72) Inventors: Christopher T. Standley, Ann Arbor, MI (US); John Charles Rafferty, Dexter, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 339 days.

(21) Appl. No.: 17/746,277

(22) Filed: May 17, 2022

(65) Prior Publication Data

US 2023/0391330 A1 Dec. 7, 2023

(51) Int. Cl.
*B60W 30/14* (2006.01)
*A61B 5/00* (2006.01)
*A61B 5/0205* (2006.01)
*A61B 5/024* (2006.01)
*A61B 5/11* (2006.01)
(Continued)

(52) U.S. Cl.
CPC ......... *B60W 30/146* (2013.01); *A61B 5/0205* (2013.01); *A61B 5/024* (2013.01); *A61B 5/112* (2013.01); *A61B 5/14542* (2013.01); *A61B 5/6801* (2013.01); *B60W 2300/40* (2013.01); *B60W 2540/221* (2020.02); *B60W 2555/20* (2020.02); *B60W 2555/60* (2020.02); *B60W 2556/40* (2020.02); *B60W 2720/10* (2013.01); *B62B 5/0069* (2013.01)

(58) Field of Classification Search
CPC .... B60W 30/146; A61B 5/0205; A61B 5/024; A61B 5/112; A61B 5/14542
See application file for complete search history.

(56) References Cited

U.S. PATENT DOCUMENTS

| 9,456,938 B2 | 10/2016 | Blickensderfer et al. |
| 10,280,054 B2 | 5/2019 | High et al. |
| 10,351,201 B1 | 7/2019 | Wright |

(Continued)

FOREIGN PATENT DOCUMENTS

| CN | 109515505 A | 3/2019 |
| GB | 2483955 A | 3/2012 |

(Continued)

*Primary Examiner* — James M McPherson
*Assistant Examiner* — Clint Pham
(74) *Attorney, Agent, or Firm* — Christopher G. Darrow; Darrow Mustafa PC (57) ABSTRACT

Mobile devices described herein relate to assisting users. In one embodiment, a mobile device for assisting a user is disclosed. The mobile device includes a motor, one or more sensors, a processor, and a memory communicably coupled to the processor and including instructions that, when executed by the processor, cause the processor to determine, using sensor data from the one or more sensors, a signature of the user that is operating the mobile device, the signature indicating at least attributes about movement of the user. The instructions include instructions to responsive to determining that the signature satisfies a trigger, adjust a speed of the mobile device by controlling the motor.

9 Claims, 4 Drawing Sheets

(51) Int. Cl.
    *A61B 5/145*         (2006.01)
    *B62B 5/00*          (2006.01)

(56) References Cited

U.S. PATENT DOCUMENTS

| | | |
|---|---|---|
| 10,569,795 B2 | 2/2020 | Castinel |
| 10,908,612 B2 | 2/2021 | Palan et al. |
| 2009/0242284 A1* | 10/2009 | Whetstone, Jr. ........ B62D 51/04 |
| | | 180/19.2 |
| 2014/0188275 A1* | 7/2014 | Lee .......................... B25J 5/007 |
| | | 901/8 |
| 2016/0031506 A1* | 2/2016 | Lloyd ..................... G08G 1/166 |
| | | 701/49 |
| 2016/0307031 A1* | 10/2016 | Zhong ..................... G06V 40/25 |
| 2017/0050659 A1* | 2/2017 | Cardano ............... G05D 1/0088 |
| 2017/0242427 A9* | 8/2017 | High .................. G06Q 30/0633 |
| 2018/0240554 A1* | 8/2018 | Vasgaard ........... A61B 5/02055 |
| 2020/0113755 A1 | 4/2020 | Seko et al. |
| 2020/0136408 A1 | 4/2020 | Rumbaugh et al. |
| 2020/0411154 A1* | 12/2020 | Lee ......................... G06V 20/10 |
| 2021/0039700 A1 | 2/2021 | Garner |
| 2021/0312025 A1* | 10/2021 | Mars ........................ G06T 19/20 |
| 2022/0288778 A1* | 9/2022 | Østergaard ........... G05D 1/0246 |

FOREIGN PATENT DOCUMENTS

| | | | |
|---|---|---|---|
| WO | 2013061320 A1 | 5/2013 | |
| WO | 2018017102 A1 | 1/2018 | |
| WO | WO-2021011784 A1 * | 1/2021 | ........... A61B 5/0022 |

* cited by examiner

MOBILE DEVICE WITH ADAPTABLE SPEED FOR ASSISTING A USER

TECHNICAL FIELD

The subject matter described herein relates, in general, to a mobile device for assisting a user, and more particularly, to a mobile device capable of adjusting the speed of the mobile device according to attributes about movement of the user.

BACKGROUND

For users, such as senior citizens and persons with health concerns, shopping can be a burden due to the energy it takes for a user to push a shopping cart. While wheelchair shopping carts eliminate the need for a user to physically push a cart while shopping, wheelchair shopping carts result in users sitting down while shopping which can present difficulties for users, such as the user standing up and getting out of the cart to reach certain items. Further, wheelchair shopping carts can be difficult to maneuver as they are large and require wide turning radiuses. Moreover, wheelchair shopping carts do not allow users to move quickly or at a pace they would normally walk. Therefore, the wheelchair shopping cart feels unnatural.

SUMMARY

Example mobile devices disclosed herein relate to assisting a user. As previously noted, users, such as senior citizens and other persons, may have difficulties pushing a shopping cart. As a result, users resort to shopping assistant systems including wheelchair shopping carts which are difficult to maneuver and unnaturally slow when shopping.

Therefore, in one embodiment, a mobile device for assisting a user is disclosed. For example, in the context of shopping, the mobile device may be a self-propelled shopping cart or walker type of device. As such, in one arrangement, the mobile device includes a hollow body for placing items therein and a mobility component for facilitating movement of the mobile device. In one approach, the mobility component is a single wheel, a set of wheels, a gyroscope-based stabilizer, or another device capable of facilitating movement of the mobile device. In one configuration, the mobile device includes a motor for propelling the mobile device. In one arrangement, the mobile device further includes one or more sensors, such as cameras, ultrasonic sensors, radar sensors, and light detection and ranging (LiDAR) sensors.

In one approach, the mobile device includes additional elements to assist a user in shopping. For example, in one embodiment, the mobile device resembles a shopping cart, where the mobile device includes four wheels, one or more telescoping arms, and one or more handles for the user to grab. In one arrangement, the one or more telescoping arms reach for, grasp, and place items that the user wants in the hollow body of the mobile device. In one configuration, the one or more handles allow the mobile device to act as a walker or mobile support device for the user.

To provide a mobile device that moves naturally with respect to a user, a mobile device with adjustable speeds is disclosed. In one arrangement, the mobile device includes a system that uses sensor data from the one or more sensors to determine a signature of the user that is operating the mobile device, where the signature indicates at least attributes about movement of the user. In one embodiment, the movements of the user include at least a speed of the user, a gait of the user, a heart rate of the user, and a blood oxygen level of the user. For example, the sensor data may include data about the location of the user in relation to the mobile device. Based on the location of the user, the system can determine the speed and/or gait of the user. In one configuration, the gait of the user depends on a height of the user, an age of the user, and an environment of the user, where the environment of the user may include a terrain of the user, the shoes the user is wearing, and a location of the user. The speed and movements of the user may depend on the heart rate and blood oxygen level of the user. For example, the heart rate and blood oxygen level of the user may indicate how fast the user is walking. Accordingly, in one arrangement, the mobile device follows the user based on the signature of the user.

Responsive to determining that the signature satisfies a trigger, the system adjusts a speed of the mobile device by controlling the motor of the mobile device. The trigger may be identified from a group including a speed of the user, a gait of the user, a presence of an obstacle, adverse weather, a speed limit, and a biometric signal of the user. The trigger, in one arrangement, is satisfied when the speed of the user changes, the gait of the user changes, an obstacle is present in the path of the user, adverse weather is present in the environment of the user, a speed limit restricts the speed the mobile device should be travelling at, and/or if a biometric signal of the user changes.

In one approach, the biometric signal of the user is a heart rate or a blood oxygen level of the user. In one embodiment, the mobile device communicates with devices, such as a mobile phone or a wearable device (e.g., a smart watch) using a wireless communication link or Bluetooth connection. As such, in one configuration, the mobile device extrapolates the biometric signal of the user from a wearable device of the user. Accordingly, the mobile device may adjust its speed according to the biometric signal of the user. In one arrangement, the mobile device decreases its speed when the heart rate of the user increases, the blood oxygen level of the user decreases, or if irregularities in the heart rate of the user are detected.

In addition to adjusting the speed of the mobile device according to a biometric signal trigger, the aforementioned triggers may also result in the system adjusting the speed of the mobile device. In one approach, when the trigger is a change in speed of the user, the system adjusts the speed of the mobile device in proportion to the speed of the user. In one arrangement, the system adjusts the speed of the mobile device according to the gait of the user. In one embodiment, the system adjusts the speed of the mobile device when an obstacle or adverse weather is detected in the path of the user. For example, if there is an obstacle in the path of the user that will cause the user to stop, the system slows the mobile device down in preparation of the user reaching the obstacle. In one arrangement, the mobile device sets its speed according to a speed limit present in the location of the mobile device.

Additionally, the speed of the mobile device may adjust based on changes to user-specific data. In one approach, the mobile device stores a user profile for a user, where the user profile contains at least one of baseline biometric data, baseline speed data, and baseline gait data about the user. For example, the baseline biometric data may include a normal walking and resting heart rate and blood oxygen level for the user, the baseline speed data may include an average walking speed of the user, and the baseline gait data may include data pertaining to the walking habits of the user (e.g., how wide the steps of the user typically are). In one arrangement, the system determines that the signature of the user satisfies the trigger when the signature of the user deviates from the at least one of the baseline biometric data, the baseline speed data, and the baseline gait data about the user. For example, if the heart rate of the user is faster than the stored baseline walking heart rate of the user, the system causes the mobile device to adjust its speed by slowing down.

Moreover, the mobile device can follow a path derived from at least a manual input, a cloud-based map, and a path of the user. In one embodiment, a manual input is input by a user using a human machine interface (HMI) directly on the mobile device, such as a touchscreen, or on a personal device of the user, such as a cellular phone. For example, the user may enter a final location for the mobile device to reach, turn-by-turn instructions for the mobile device to follow, or other instructions regarding a path for the mobile device to follow. In one configuration, the cloud-based map is retrieved from a personal device of the user, a device associated with the location of the user (e.g., a grocery store, building, etc.), or any other device capable of connecting to the mobile device via a wireless communication link or Bluetooth. Accordingly, in one embodiment, the mobile device utilizes the cloud-based map to navigate at a given location. In one approach, the mobile device follows the path of the user using sensor data retrieved from the one or more sensors of the mobile device. In one configuration, the mobile device follows a path using any combination of manual inputs, cloud-based maps, and paths of the user. In any case, the mobile device may lead or follow the user according to the path the mobile device takes. In this way, the mobile device provides for an improved method of assisting a user by adjusting a speed of the mobile device based on movements of the user.

In one embodiment, a mobile device for assisting a user is disclosed. The mobile device includes a motor, one or more sensors, a processor, and a memory communicably coupled to the processor and including instructions that, when executed by the processor, cause the processor to determine, using sensor data from the one or more sensors, a signature of the user that is operating the mobile device, the signature indicating at least attributes about movement of the user. The instructions include instructions to responsive to determining that the signature satisfies a trigger, adjust a speed of the mobile device by controlling the motor.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Example mobile devices associated with assisting a user are disclosed. As previously discussed, shopping can be a burdensome task for individuals, such as senior citizens and other persons. Current devices for assisting users as they shop, such as wheelchair shopping carts, are restrictive, slow, and move unnaturally. For example, wheelchair shopping carts usually have a low speed limit and require users to sit down while they use the cart.

Therefore, in one embodiment, a mobile device with an improved method of assisting a user by adjusting a speed of the mobile device based on a signature of the user satisfying a trigger is disclosed. In the context of shopping, the mobile device may be a self-propelled shopping cart or walker type device. To allow users to place items in the mobile device similar to how items are placed in a shopping cart, the mobile device includes a body for placing items therein. In one approach, the body of the mobile device is substantially hollow or includes a hollow portion. The hollow portion of the body may be covered by a lid. Further, the mobile device includes a mobility component for facilitating movement of the mobile device. In one approach, the mobility component is a single wheel, a set of wheels, a gyroscope-based stabilizer, or another device capable of facilitating movement of the mobile device. In one configuration, the mobile device includes a motor for propelling the mobile device. In one embodiment, the mobile device controls the motor to propel the mobile device by sending a control signal to the motor that adapts a revolution per minute (RPM) of the motor.

The mobile device further includes one or more sensors, such as cameras, ultrasonic sensors, radar sensors, and light detection and ranging (LiDAR) sensors. In one configuration, sensor data from the one or more sensors is used to determine attributes about the environment of the mobile device to assist the mobile device in navigating a particular terrain. In one approach, the sensor data includes location data about a user in relation to the mobile device.

The mobile device may include additional elements to assist a user in shopping. For example, in one embodiment, the mobile device resembles a shopping cart, where a substantial portion of the mobile device is hollow and where the mobile device includes two sets of wheels, one or more telescoping arms, and one or more handles for the user to grab. In one arrangement, the one or more telescoping arms reach for, grasp, and place items that the user wants in the hollow body of the mobile device. In one arrangement, the mobile device sends a control signal to the one or more telescoping arms when a user wants the mobile device to grab an item of interest for the user. In one approach, the mobile device stores a shopping list of the user. When the mobile device identifies an item on the list, the mobile device causes the one or more telescoping arms to reach for and place the item in the hollow body of the mobile device. In one configuration, the one or more handles allow the mobile device to act as a walker or mobile support device for the user. For example, the user may hold onto the one or more handles as the mobile device propels itself forward using the motor. As such, the user uses the mobile device as a walker without physically pushing the mobile device.

To provide a mobile device that moves naturally with respect to a user, a mobile device with adjustable speeds is disclosed. In one arrangement, the mobile device includes a system that uses sensor data from the one or more sensors to determine a signature of the user that is operating the mobile device, where the signature indicates at least attributes about movement of the user. In one embodiment, the movements of the user include at least a speed of the user, a gait of the user, a heart rate of the user, and a blood oxygen level of the user. In one arrangement, the sensor data includes data about the location of the user in relation to the mobile device. Based on the location of the user as the mobile device moves, the system can determine the speed of the user. In one configuration, the mobile device uses the sensor data to determine the gait of the user. In one approach, the gait of the user depends on a height of the user, an age of the user, and an environment of the user, where the environment of the user may include a terrain of the user, the shoes the user is wearing, and a location of the user. Depending on the height, age, and an environment of the user, as indicated by the sensor data, the mobile device learns the gait of the user.

In addition to the speed and gait of the user, the signature of the user depends, at least in part, on the heart rate and blood oxygen level of the user. In one arrangement, the speed of the user depends on the heart rate and the blood oxygen level of the user. The heart rate and blood oxygen level of the user may be received from a personal device of the user, such as a cellular device or wearable device (e.g., a smart watch). Accordingly, in one arrangement, the mobile device follows the user based on the signature (e.g., the speed, gait, heart rate, or blood oxygen level) of the user.

Responsive to determining that the signature satisfies a trigger, the system adjusts a speed of the mobile device by controlling the motor of the mobile device. Specifically, as previously mentioned, the mobile device controls the motor by causing the motor to receive a control signal that changes the RPM of the motor. For example, to increase the speed of the mobile device, the mobile device causes the motor to increase its RPM and vice versa. The trigger may be identified from a group including a speed of the user, a gait of the user, a presence of an obstacle, adverse weather, a speed limit, and a biometric signal of the user. The trigger, in one arrangement, is satisfied when the speed of the user changes, the gait of the user changes, an obstacle is present in the path of the user, adverse weather is present in the environment of the user, a speed limit restricts the speed the mobile device should be travelling at, and/or if a biometric signal of the user changes.

In one approach, the biometric signal of the user is a heart rate or a blood oxygen level of the user. In one embodiment, the mobile device communicates with devices, such as a mobile phone or a wearable device (e.g., a smart watch) using a wireless communication link or Bluetooth connection. As such, in one configuration, the mobile device communicates with a wearable device of the user to extrapolate the biometric signal of the user. Accordingly, the mobile device may adjust its speed according to the biometric signal of the user. In one arrangement, the mobile device decreases its speed when the heart rate of the user increases, the blood oxygen level of the user decreases, or if irregularities in the heart rate of the user (e.g., arrhythmia) are detected.

In addition to adjusting the speed of the mobile device according to a biometric signal trigger, the aforementioned triggers may also result in the system adjusting the speed of the mobile device. In one approach, when the trigger is a change in speed of the user, the system adjusts the speed of the mobile device in proportion to the speed of the user. For example, if the user begins to walk slower, the mobile device decreases its speed. In one arrangement, the mobile device adjusts its speed according to the gait of the user. For example, if the user begins walking with a different stride than when the user first began walking, thereby using a new gait, the mobile device adjusts its speed to follow the user in accordance with the new gait. In one embodiment, the system adjusts the speed of the mobile device when an obstacle or adverse weather is detected in the path of the user. For example, if there is an obstacle in the path of the user that will cause the user to stop, the mobile device slows down in preparation of the user reaching the obstacle. If adverse weather, such as water in the path of the user, is detected that will cause the user to stop or move around the adverse weather, the mobile device adjusts its speed accordingly by slowing down. In one arrangement, if a speed limit is present in the location of the mobile device, the mobile device adjusts its speed to be within the appropriate range of speed for the given location.

The speed of the mobile device may adjust based on changes to user-specific data. In one approach, the mobile device stores a user profile for a user, where the user profile contains at least one of baseline biometric data, baseline speed data, and baseline gait data about the user. For example, the baseline biometric data may include a normal walking and resting heart rate and blood oxygen level for the user, the baseline speed data may include an average walking speed of the user, and the baseline gait data may include data pertaining to the walking habits of the user (e.g., how wide the steps of the user typically are). In one arrangement, the system determines that the signature of the user satisfies the trigger when the signature of the user deviates from the at least one of the baseline biometric data, the baseline speed data, and the baseline gait data about the user. For example, if the heart rate of the user is faster than the stored baseline walking heart rate of the user, the system causes the mobile device to adjust its speed by slowing down. In one configuration, if the gait of the user is different than the baseline gait of the user, the mobile device may determine that the change in gait is due to the shoe type of the user, the location of the user, and/or the terrain of the user. As such, the mobile device adjusts its speed according to the current gait of the user. Further, the mobile device may update the baseline gait data of the user to include the baseline gait of the user when the user is wearing a specific pair of shoes, in a specific location, and at a specific terrain.

Moreover, the mobile device can follow a path derived from at least a manual input, a cloud-based map, and a path of the user. In one embodiment, a manual input is input by a user using a human machine interface (HMI) directly on the mobile device, such as a touchscreen, or on a personal device of the user, such as a cellular phone. For example, the user may enter a final location for the mobile device to reach, turn-by-turn instructions for the mobile device to follow, or other instructions regarding a path for the mobile device to follow. In one configuration, the cloud-based map is downloaded from a personal device of the user, a device associated with the location of the user (e.g., a grocery store, building, etc.), or any other device capable of connecting to the mobile device via a wireless communication link or Bluetooth. For example, the mobile device may connect with a system of a grocery store when the mobile device enters the grocery store. Once connected, in one arrangement, the mobile device sends a request for a map of the grocery store so that the mobile device can better navigate the grocery store. Accordingly, in one embodiment, when the mobile device receives the cloud-based map, the mobile device utilizes the cloud-based map to navigate at a given location. In one approach, the mobile device follows the path of the user using sensor data retrieved from the one or more sensors of the mobile device. For example, in one approach, the mobile device uses the sensor data to determine the location of the user in relation to the mobile device and follows the location of the user.

In one configuration, the mobile device follows a path using any combination of manual inputs, cloud-based maps, and paths of the user. In any case, the mobile device may lead or follow the user according to the path the mobile device takes. In this way, the mobile device provides for an improved method of assisting a user by adjusting a speed of the mobile device based on movements of the user.

Figure 1:
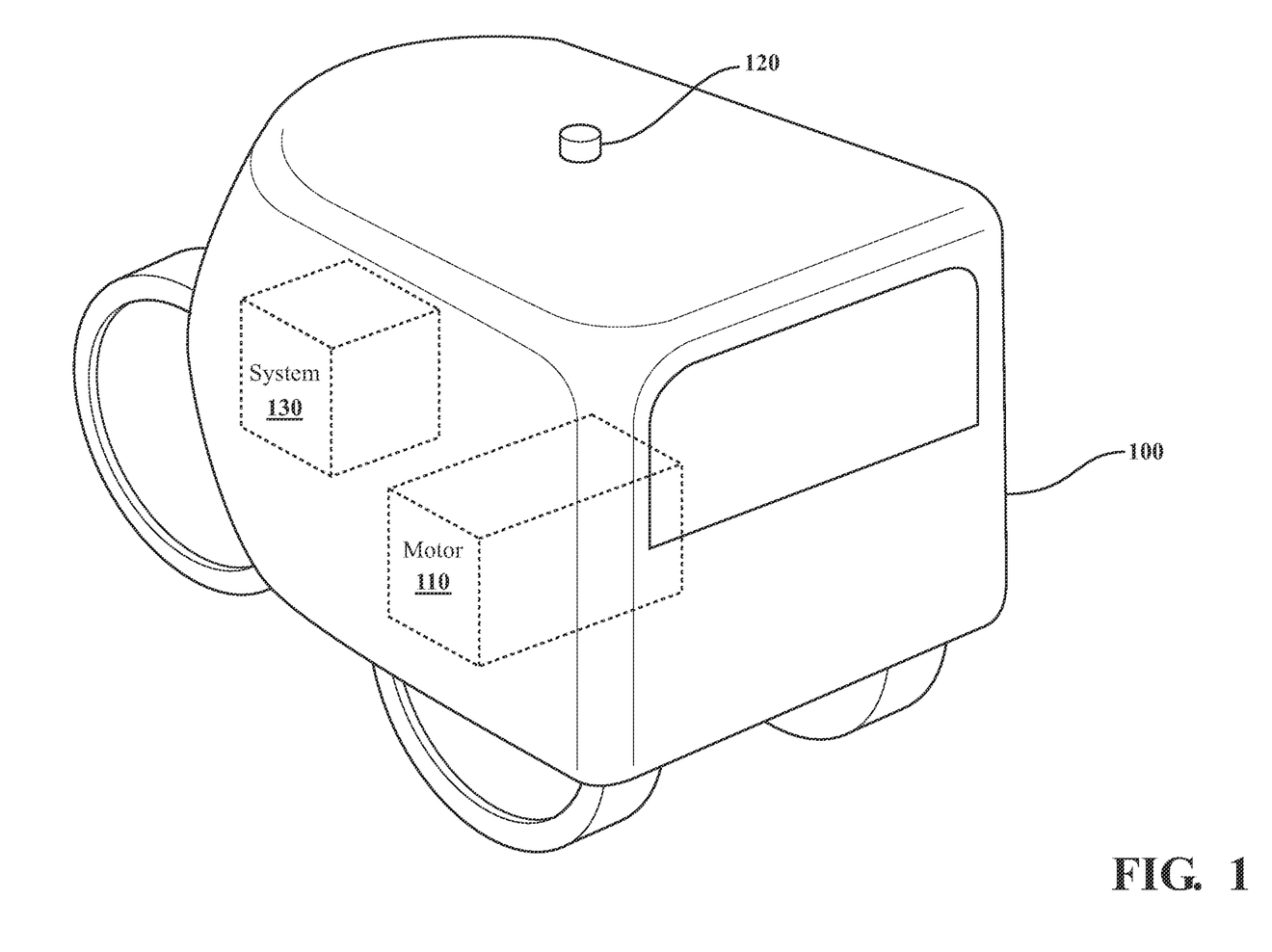
FIG. 1 illustrates one embodiment of a mobile device within which systems and methods disclosed herein may be implemented.

Referring to FIG. 1, an example of a mobile device 100 is illustrated. The mobile device 100 includes various elements. It will be understood that in various embodiments it may not be necessary for the mobile device 100 to have all of the elements shown in FIG. 1. The mobile device 100 can have any combination of the various elements shown in FIG. 1. Further, the mobile device 100 can have additional elements to those shown in FIG. 1. In some arrangements, the mobile device 100 may be implemented without one or more of the elements shown in FIG. 1.

Some of the possible elements of the mobile device 100 are shown in FIG. 1 and will be described along with subsequent figures. It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the mobile device 100 includes the elements shown in FIG. 1 implemented to perform methods and other functions as disclosed herein relating to assisting a user who is operating the mobile device 100.

In one configuration, the mobile device 100 includes a body and a mobile component. In one embodiment, the body of the mobile device 100 includes a hollow portion for items to be placed therein. In one arrangement, to secure items placed in the mobile device 100, the mobile device 100 includes a lid to cover the hollow portion of the body. To facilitate movement of the mobile device 100, in one approach, the mobility component is a single wheel, a set of wheels, a gyroscope-based stabilizer, or another device capable of facilitating movement of the mobile device. The mobile device 100 also includes, for example, a motor 110 to propel the mobile device 100. The motor 110 moves the mobile device 100 when the rotor of the motor 110 revolves. Additionally, to control the movement of the mobile device 100, the mobile device 100 transmits a control signal to the motor 110 which causes the rotor of the motor 110 to revolve and adjust its revolutions per minute (RPM) to change the speed of the mobile device 100. As such, when the motor 110 moves the mobile device 100, the mobility component of the mobile device 100 facilitates the movement of the mobile device 100.

Furthermore, the mobile device 100 includes a system 130 that is implemented to perform methods and other functions as disclosed herein relating to adjusting a speed of the mobile device 100. That is, the mobile device 100 includes the system 130 as an approach to adapting how the mobile device 100 moves through an environment and in relation to a user, as discussed further in relation to FIG. 2.

Figure 2:
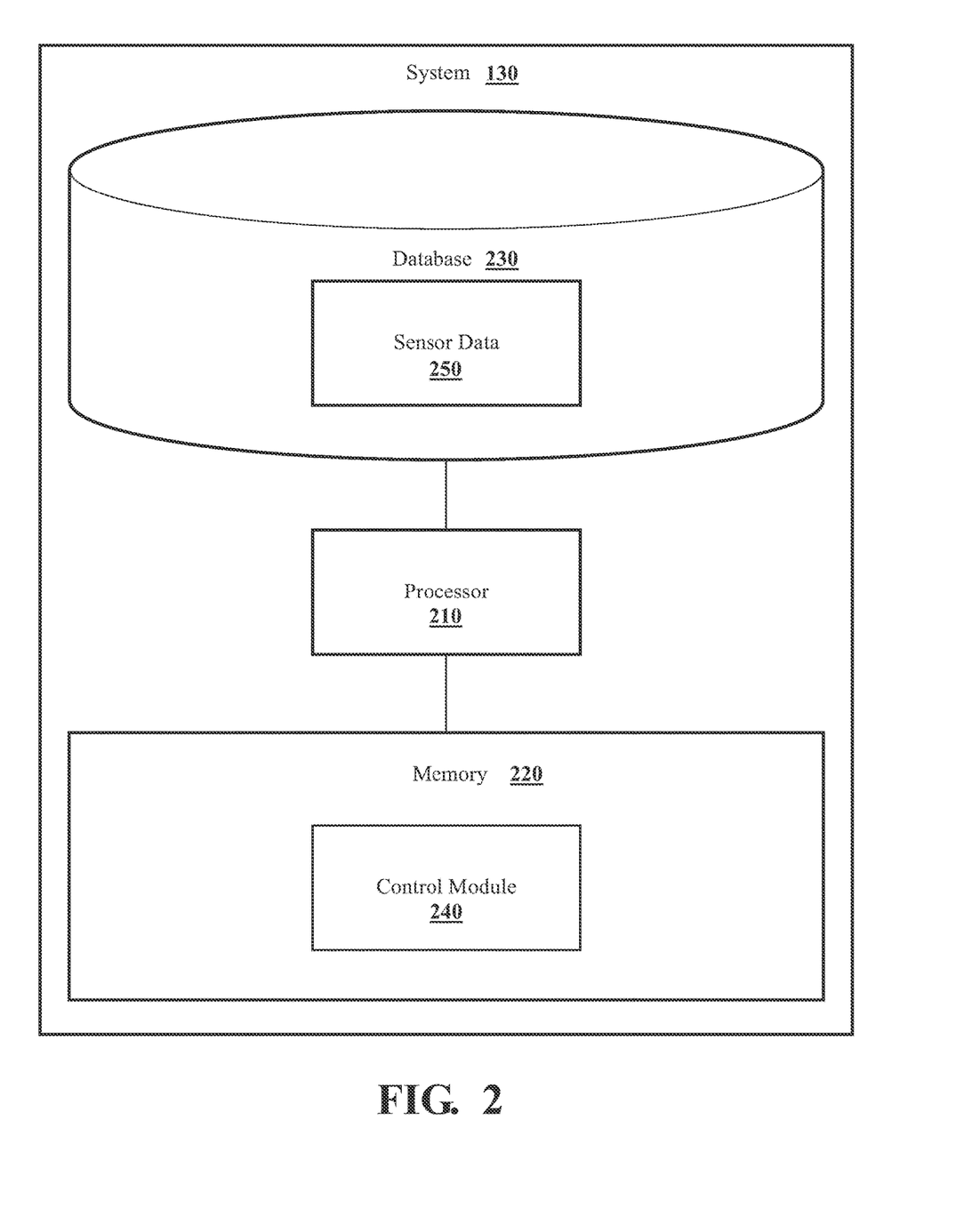
FIG. 2 illustrates one embodiment of a system that is associated with adjusting a speed of a mobile device.

With reference to FIG. 2, one embodiment of the system 130 of FIG. 1 is further illustrated. The system 130 is shown as including a processor 210 from the mobile device 100 of FIG. 1. Accordingly, the processor 210 may be a part of the system 130, the system 130 may include a separate processor from the processor 210 of the mobile device 100, or the system 130 may access the processor 210 through a data bus or another communication path. In one embodiment, the system 130 includes a memory 220 that stores a control module 240. The memory 220 is a random-access memory (RAM), read-only memory (ROM), a hard-disk drive, a flash memory, or other suitable memory for storing the control module. The control module 240 is, for example, computer-readable instructions that when executed by the processor cause the processor 210 to perform the various functions disclosed herein.

The control module 240 generally includes instructions that function to control the processor 210 to receive data inputs from one or more sensors 120 of the mobile device 110. The data inputs are, in one embodiment, observations of one or more objects, such as a user, in an environment proximate to the mobile device 100 and/or other aspects about the surroundings. As provided for herein, the control module 240, in one embodiment, acquires sensor data 250 that includes at least camera images. In further arrangements, the control module 240 acquires the sensor data 250 from further sensors 120 such as a radar, a LiDAR, an ultrasound sensor, and other sensors as may be suitable for identifying users and locations of users in the surroundings of the mobile device 100. In one configuration, the control module 240 acquires the sensor data 250 from a wearable device of the user, such as a heart rate monitor, smart watch, etc., where the sensor data 250 includes biometric data about the user, such as the heart rate, electrocardiogram (EKG or ECG) signals, and the blood oxygen level of the user.

Accordingly, the control module 240, in one embodiment, controls the respective sensors 120 to provide the data inputs in the form of the sensor data 250. Additionally, while the control module 240 is discussed as controlling the various sensors 120 to provide the sensor data 250, in one or more embodiments, the control module 240 can employ other techniques to acquire the sensor data 250 that are either active or passive. For example, the control module 240 may passively sniff the sensor data 250 from a stream of electronic information provided by the various sensors 120 to further components within the mobile device 100. Moreover, the control module 240 can undertake various approaches to fuse data from multiple sensors 120 when providing the sensor data 250 and/or from sensor data 250 acquired over a wireless communication link. Thus, the sensor data 250, in one embodiment, represents a combination of perceptions acquired from multiple sensors 120.

In addition to locations of surrounding objects, the sensor data 250 may also include, for example, information about a user of the mobile device 100. Moreover, the control module 240, in one embodiment, controls the sensors 120 to acquire the sensor data 250 about an area that encompasses 360 degrees about the mobile device 100 in order to provide a comprehensive assessment of the surrounding environment. Of course, in alternative embodiments, the control module 240 may acquire the sensor data 250 about a forward direction alone when, for example, the mobile device 100 is not equipped with further sensors 120 to include additional regions about the mobile device 100 and/or the additional regions are not scanned due to other reasons. In one configuration, the control module 240 controls the sensors 120 to acquire the sensor data about movements of the user.

Moreover, in one embodiment, the system 130 includes a data store 230. In one embodiment, the data store 230 is a database. The database is, in one embodiment, an electronic data structure stored in the memory 220 or another data store and that is configured with routines that can be executed by the processor 210 for analyzing stored data, providing stored data, organizing stored data, and so on. Thus, in one embodiment, the data store 230 stores data used by the control module 240 in executing various functions. In one embodiment, the data store 230 includes the sensor data 250 along with, for example, metadata that characterize various aspects of the sensor data 250. In one embodiment, the data store 230 further includes other information that is used by the control module 240.

The control module 240, in one approach, is further configured to perform additional tasks beyond controlling the respective sensors 120 to acquire and provide the sensor data 250. In one embodiment, the control module 240 determines, using sensor data 250 from the one or more sensors 120, a signature of the user that is operating the mobile device 100, the signature indicating at least attributes about movement of the user, where the attributes about the movement of the user include at least a speed of the user, a gait of the user, a heart rate of the user, and a blood oxygen level of the user. In one arrangement, the control module 240 identifies the signature of the user from the sensor data 250 by identifying the location of the user relative to the mobile device 100. For example, the control module 240, in one configuration, determines the speed of the user based on the distance between the mobile device 100 and the user as both the mobile device 100 and the user move. Additionally, the speed of the mobile device 100 depends, in one embodiment, on the signature of the user.

The signature of the user can be based, at least in part, on the gait of the user. Determination of the gait includes, in one or more arrangements, a height of the user, an age of the user, and an environment of the user. For example, taller users take longer strides than users who are shorter, which contributes to a gait of any given user. Accordingly, in one arrangement, the speed of the mobile device 100 is faster for users who are taller than for users who are shorter. Users who are younger generally take smaller and faster strides than users who are older. As such, the mobile device 100 is faster for users who are younger than for users who are older. The environment of the user may include a terrain of the user, a location of the user, a shoe type of the user, and other factors that contribute to the way in which a user walks. For example, if a user is at a location with a terrain that includes many hills, the user will likely walk slower and take different strides to accommodate for the hills in contrast to how a user normally walks on a flat surface. In one embodiment, if a user is wearing heels or shoes that are difficult to walk in, the user will take smaller, slower strides to adjust to walking in uncomfortable shoes in contrast to how a user would walk in sneakers or supportive shoes, for example. Accordingly, the speed of the mobile device 100 is adjusted depending on how the terrain, location, and shoe type of the user affect the gait of the user.

Further, the signature of the user may be based, at least in part, on the heart rate and blood oxygen level of the user. The heart rate and blood oxygen level of the user reflect attributes about movement of the user. For example, the control module 240, in one approach, determines whether the user is walking and at what pace based on the heart rate and blood oxygen level of the user. Accordingly, the speed of the mobile device may depend on the heart rate and blood oxygen level of the user.

In any case, the control module 240 identifies, using sensor data 250 of the one or more sensors 120, the signature of the user. Based on the signature of the user, the control module 240 sets a speed for the mobile device 100 for traveling.

After setting the speed of the mobile device 100, the control module 240 determines whether to adjust the speed of the mobile device 100. In one arrangement, responsive to determining that the signature satisfies a trigger, the control module adjusts a speed of the mobile device 100 by controlling the motor 110. In one embodiment, the trigger is identified from a group including a speed of the user, a gait of the user, a presence of an obstacle, adverse weather, a speed limit, and a biometric signal of the user. The biometric signal of the user is at least one of a heart rate and a blood oxygen level of the user. The trigger, in one approach, is satisfied when the speed of the user changes, the gait of the user changes, an obstacle is present in the path of the user, adverse weather is present in the environment of the user, a speed limit restricts the speed the mobile device 100 should be travelling at, and/or if a biometric signal of the user changes.

In one embodiment, the mobile device 100 communicates with devices, such as a mobile phone or a wearable device (e.g., a smart watch), to receive the biometric signal of the user by establishing a wireless communication link or Bluetooth connection with the devices. The control module 240 determines whether an existing wireless connection exists between the mobile device 100 and a second device by identifying and testing an existing wireless connection.

If a wireless connection does not exist between the mobile device 100 and the second device, the control module 240 establishes a wireless connection between the mobile device 100 and the second device. For example, the control module 240 may establish the wireless connection by using a handshake process. In any case, when a wireless connection is established, the control module 240, in one embodiment, receives sensor data 250 from the second device, where the second device includes a heart rate, an electrical signal of the heart (e.g., electrocardiogram (EKG or ECD) signal), and/or blood oxygen level of the user. For example, when the second device is a smart watch, the control module 240 receives sensor data about the heart rate, an electrical signal of the heart, and blood oxygen level of the user via the wireless connection between the mobile device 100 and the smart watch.

Accordingly, when the control module 240 determines that the sensor data 250 corresponding to a biometric signal of the user changes, the control module 240 adjusts the speed of the mobile device 100 by controlling the motor 110. In one embodiment, the control module 240 decreases the speed of the mobile device 100 by controlling the motor 110 to lower its RPM when the heart rate of the user increases, the EKG or ECG signal of the user indicates that the heart rate of the user increases, the blood oxygen level of the user decreases, and/or when irregularities in the heart rate of the user (e.g., arrhythmia) are present. For example, if a user has a sudden increase in heart rate, experiences irregularities in heart rate, and/or if a user experiences a lower blood oxygen level, it may indicate that the user is walking too quickly, having trouble breathing, or having difficulty receiving the proper levels of oxygen as they walk, and as such, the user is likely to slow down. Accordingly, in response to the user's blood oxygen level decreasing, the control module slows down the mobile device 100.

In addition to adjusting the speed of the mobile device 100 in response to a change in the biometric signal of the user, the control module 240 adjusts the speed of the mobile device based on the aforementioned triggers. For example, the control module 240 may adjust the speed of the mobile device 100 in proportion to the speed of the user. In one embodiment, the control module 240 analyzes the sensor data 250 to determine the speed of the user, and if the user begins walking faster, the control module 240 causes the motor 110 of the mobile device 100 to increase its RPM to increase the speed of the mobile device 100 to the same degree as the user increased speed.

Further, the control module 240, in one approach, adjusts the speed of the mobile device 100 in response to a change in the gait of the user. For example, if the user begins taking longer strides that allows the user to cover more ground than when the user usually walks (e.g., a change in gait), the control module 240 causes the mobile device 100 to increase its speed by increasing the RPM of the motor 110.

In one embodiment, the control module 240 adjusts the speed of the mobile device 100 in response to receiving sensor data 250 that indicates an obstacle is present in the path of the user. An obstacle is any obstruction in the path of the mobile device 100 and/or the user, such as other people, objects, spills, animals, etc. For example, if the mobile device 100 and the user approach a crowded area where many people are present, the user will likely slow down. As such, when the sensor data 250 indicates a crowded area ahead of the user, the control module 240 causes the mobile device 100 to slow down by decreasing the RPM of the motor 110.

Additionally, the control module 240 adjusts the speed of the mobile device 100 in response to receiving sensor data 250 that indicates adverse weather in the path of the user. For example, if it is raining, a user may decide to walk faster to get out of the rain. Accordingly, when the sensor data indicates rain is present in the path of the user, the control module 240 causes the mobile device 100 to speed up by increasing the RPM of the motor 110.

The control module 240 may adjust the speed of the mobile device 100 to conform with a speed limit of a given location. In one approach, the control module 240 requests speed limit information over a wireless communication link from a system of a location when the mobile device 100 enters the location. When the mobile device 100 receives speed limit information, the control module 240 determines whether the mobile device 100 is travelling within the restrictions of the speed limit. If the mobile device 100 is travelling faster than the speed limit of the location, in one arrangement, the control module 240 causes the mobile device 100 to slow down by decreasing the RPM of the motor 110. If, however, the mobile device 100 is travelling below the speed limit of the location or if the location does not have a speed limit, the mobile device 100 continues to travel as it normally would by following a user according to the signature of the user. In any case, when the signature satisfies the trigger, the control module 240 adjusts the speed of the mobile device 100.

In one embodiment, the control module 240 adjusts the speed of the mobile device according to user-specific data about the user. In one approach, the mobile device 100 stores a user profile for a user in the database 230, where the user profile contains at least one of baseline biometric data, baseline speed data, and baseline gait data about the user. For example, the baseline biometric data may include a normal walking and resting heart rate and blood oxygen level for the user, the baseline speed data may include an average walking speed of the user, and the baseline gait data may include data pertaining to the walking habits of the user (e.g., how wide the steps of the user typically are). In one arrangement, the control module 240 determines that the signature of the user satisfies the trigger when the signature of the user deviates from the at least one of the baseline biometric data, the baseline speed data, and the baseline gait data about the user.

For example, if the current heart rate of the user is faster than the stored baseline walking heart rate of the user, the control module 240 causes the mobile device 100 to decrease its speed by lowering the RPM of the motor 110. In one configuration, if the gait of the user is different than the baseline gait of the user, the control module 240 determines whether the change in gait is due to the shoe type of the user, the location of the user, and/or the terrain of the user. As such, the control module 240 adjusts its speed according to the current gait of the user. Further, the control module 240 updates the baseline gait data of the user in the user profile to include the baseline gait of the user when the user is wearing a specific pair of shoes, in a specific location, and at a specific terrain.

In one arrangement, the mobile device 100 travels in accordance with a specific path. For example, the mobile device 100 may follow a path derived from at least one of a manual input, a cloud-based map, and a path of the user. In one embodiment, a manual input is input by a user using a human machine interface (HMI) directly on the mobile device 100, such as a touchscreen, or on a personal device of the user, such as a cellular phone. For example, the user may input a final location for the mobile device 100 to reach, turn-by-turn instructions for the mobile device 100 to follow, or other instructions regarding a path for the mobile device to follow. The user may update the path of the mobile device 100 as the user walks using a manual input.

In one configuration, the cloud-based map is downloaded from a personal device of the user, a device associated with the location of the user (e.g., a grocery store, building, etc.), or any other device capable of connecting to the mobile device 100 via a wireless communication link or Bluetooth. For example, the control module 240 may establish a wireless communication link with a system of a grocery store when the mobile device 100 enters the grocery store. Once connected, the control module 240 sends a request for a map of the grocery store over the wireless communication link. When the control module 240 receives the cloud-based map, the control module 240 utilizes the cloud-based map to cause the mobile device 100 to navigate a given location. The control module 240 may receive updates to the cloud-based map as the mobile device 100 navigates. For example, if an aisle in the grocery store has a spill or is closed, the control module 240, in one arrangement, uses the information about the spill or closure to cause the mobile device 100 to follow a path that takes the mobile device 100 around the restricted area.

In one approach, the mobile device 100 directly follows the path of the user as the user walks using sensor data retrieved from the one or more sensors 120 of the mobile device. For example, in one approach, the control module 240 uses the sensor data 250 to determine the location of the user in relation to the mobile device 100 and causes the mobile device 100 to follow the path of the user at a predetermined distance. The predetermined distance may be preset (e.g., 5 feet from the user), chosen from the user from a range of options (e.g., the user has a choice to set the predetermined distance to be 2 feet, 3 feet, 4 feet, etc.), or input by a user using an HMI (e.g., a user uses a touchscreen located on the mobile device 100 to set the predetermined distance to be 5 feet).

The mobile device 100 may follow a path using any combination of manual inputs, cloud-based maps, and paths of the user. In any case, the mobile device 100 may lead or follow the user according to the path the mobile device 100 takes. In one approach, the user may choose whether the mobile device 100 leads or follows by inputting the decision on an HMI of the mobile device 100 or by using a personal device. For example, the user can input a signal using a touchscreen located on the mobile device 100 to cause the mobile device 100 to lead or follow the user.

Figure 3:
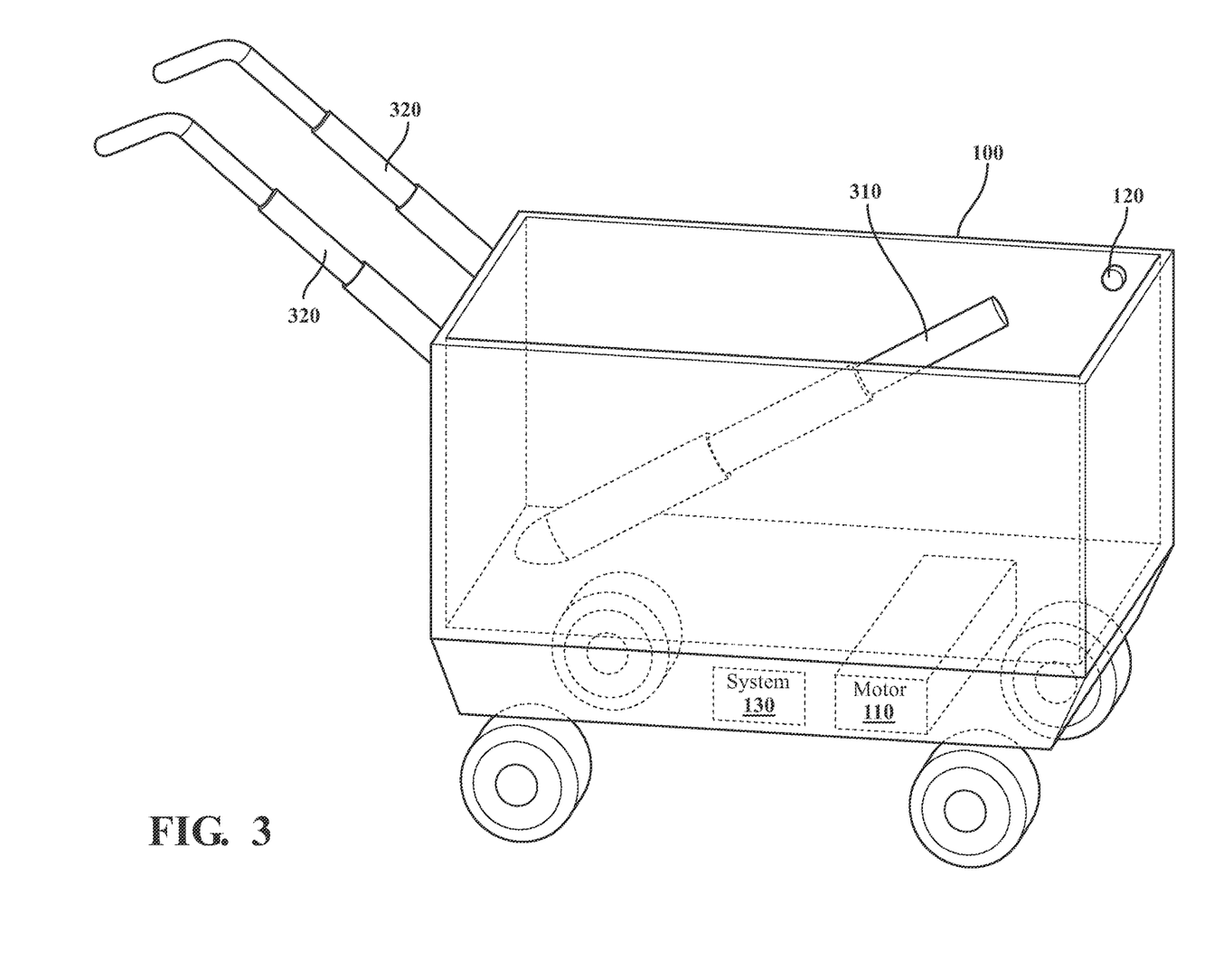
FIG. 3 illustrates one embodiment of the mobile device of FIG. 1 that is associated with the mobile device functioning as a shopping cart.

With reference to FIG. 3, one embodiment of the mobile device 100 of FIG. 1 is further illustrated. The mobile device of FIG. 3 is associated with the mobile device 100 functioning as a shopping cart. In one configuration, the mobile device includes a body that is substantially hollow and shaped like a grocery cart to allow users to place items therein. In one arrangement, the mobile device 100 includes a mobility component, where the mobility component is two sets of wheels (i.e., a set of two front wheels and a set of two rear wheels). Further, the mobile device 100 includes a motor 110 to move the mobile device 100. In one embodiment, the mobile device 100 includes one or more sensors 120 located on the body of the mobile device 100. While the mobile device 100 is illustrated as having one sensor 120 on the body of the mobile device 100, it should be understood that any number of sensors 120 may be implemented on the body of the mobile device 100.

The mobile device 100 may include elements that assist the user in shopping. In one arrangement, the mobile device 100 includes one or more telescoping arms 310. While FIG. 3 illustrates the mobile device 100 as having one telescoping arm 310, in one or more arrangements, the mobile device 100 can have any number of telescoping arms 310. In one configuration, the telescoping arm includes a clasp or any other device capable of grabbing objects on one end of the telescoping arm 310. In one embodiment, the telescoping arm 310 is movable between a retracted and extended position. In the retracted position, the telescoping arm 310 lies substantially flat against the body of the mobile device 100.

In one approach, the control module 240 causes the telescoping arm 310 to extend and grab items that a user requests the mobile device 100 to grab. The user may send a request using an input from an HMI located directly on the mobile device 100, such as a touchscreen, on a personal device, such as a cellular device, or by pointing to an item that the user wants the mobile device 100 to grab. For example, the user may upload a list of items that the user wants the mobile device 100 to grab while the user is shopping. The list may include images of the items, descriptions of the items, etc., that help the mobile device 100 identify the items from the sensor data acquired by the one or more sensors 120 of the mobile device 100. In one embodiment, the database 230 includes image data of items that can be found in a grocery store that correspond to the names of the items the pictures represent. As such, when a user requests the mobile device 100 to retrieve an item, the control module 240 analyzes the sensor data 250 to determine if the requested item is present in the environment of the mobile device 100. In one arrangement, when the item is present in the environment of the mobile device 100, the control module 240 causes the telescoping arm 310 to extend, grasp the item, and place the item in the body of the mobile device 100.

The mobile device 100 may include elements to assist in the mobility of the user. In one embodiment, the mobile device 100 includes one or more telescoping handles 320. While FIG. 3 illustrates the mobile device 100 as having two telescoping handles 320, it should be understood that the mobile device 100, in one or more arrangements, has one telescoping handle 320 or more than two telescoping handles 320. In one embodiment, the telescoping handles 320 may telescope to predetermined lengths (e.g., a first length, a second length, a third length, etc.). A user can adjust the length of the telescoping arms 320 depending on the needs of the user. In one approach, when the user is satisfied with the length of the telescoping arms 320, the telescoping arms 320 may be locked into place using any suitable locking mechanism, such as pegs, lock pins, etc. In any case, the telescoping handles 320 act as support structures for a user. The user may grasp the telescoping handles 320 as the mobile device 100 travels. In this way, the user does not need to physically push the mobile device 100 but instead may use the mobile device 100 as a walker or to assist the user in walking.

Figure 4:
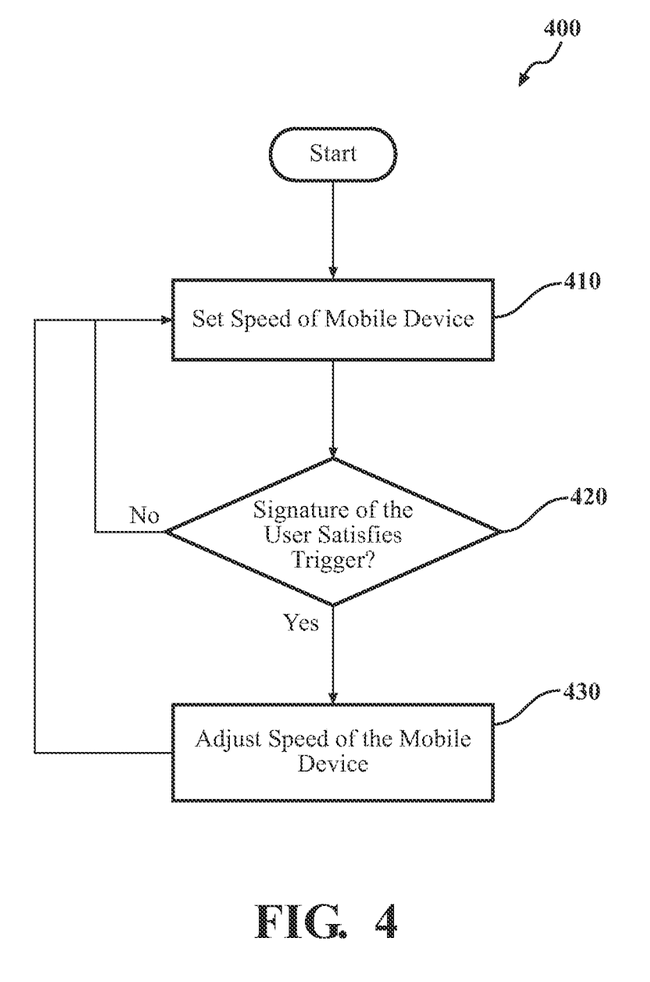
FIG. 4 is a flowchart illustrating one embodiment of a method associated with adjusting the speed of a mobile device.

Additional aspects of adjusting a speed of a mobile device will be discussed in relation to FIG. 4. FIG. 4 illustrates a flowchart of a method 400 that is associated with adjusting the speed of the vehicle 100. Method 400 will be discussed from the perspective of the system of the mobile device 100 of FIGS. 1 and 2. While method 400 is discussed in combination with the system of the mobile device 100, it should be appreciated that the method 400 is not limited to being implemented within the system of the mobile device 100 but is instead one example of a system that may implement the method 400.

At 410, the speed of the mobile device 100 is set in response to the control module 240 determining, using the sensor data 250 from the one or more sensors 120, a signature of the user that is operating the mobile device, the signature indicating at least attributes about movement of the user. In one arrangement, the signature of the user is unique to one user, as the signature of the user, in one embodiment, is based on at least a speed of the user, a gait of the user, a heart rate of the user, and a blood oxygen level of the user. In one arrangement, the sensor data 250 includes location data about the user, which when analyzed by the control module 240, indicates the speed of the user. For example, the sensor 120 may be a LiDAR sensor. In one embodiment, a LiDAR sensor of the mobile device 100 scans the environment of the mobile device 100. The control module 240 analyzes the sensor data 250 received from the LiDAR sensor to identify a user in the environment of the mobile device 100 and to identify a location of the user in relation to the mobile device 100. In one or more arrangements, a radar sensor, camera sensor, and/or ultrasound sensor is used in addition to or in replacement of a LiDAR sensor to acquire sensor data about a location of the user relative to the mobile device 100.

Additionally, the sensor data 250 may be received from a personal device of the user, such as a cellular phone or wearable device (e.g., a smart watch), where the sensor data 250 includes at least the heart rate of the user, an EKG or ECG signal of the user, and a blood oxygen level of the user. In any case, the control module 240, in one approach, identifies the signature of the user from the sensor data 250 by identifying attributes about movement of the user, such as a speed of the user, a gait of the user, a heart rate of the user, and a blood oxygen level of the user. For example, in one configuration, the control module 240 determines the speed of the user based on the distance between the mobile device 100 and the user as both the mobile device 100 and the user move.

In addition to the speed of the user, the signature of the user is based, at least in part, on the gait of the user. In one embodiment, the gait of the user depends on a height of the user, an age of the user, and an environment of the user. As such, in one approach, the control module 240 identifies factors that affect gait about a user who is operating the mobile device 100 from the sensor data 250. In one configuration, the control module 240 extrapolates data from the sensor data 250 about the user to determine a height of the user, an approximate age of the user (e.g., based off of physical features of the user, such as height, movement, etc.), and an environment of the user (e.g., the terrain, the shoe type of the user, etc.). For example, users who are taller take longer strides than users who are shorter which contributes to a gait of any given user. Accordingly, in one arrangement, the set speed of the mobile device 100 is faster for users who are taller than for users who are shorter. Users who are younger generally take smaller, faster strides than users who are elderly. As such, in one embodiment, the set speed of the mobile device 100 is faster for users who are younger.

The environment of the user may include a terrain of the user, a location of the user, a shoe type of the user, and other factors that contribute to the gait of the user. For example, if a user is at a location with a terrain that includes many hills, the user will likely walk slower and take different strides to accommodate for the hills in contrast to how a user normally walks on a flat surface. Accordingly, in one configuration, the set speed of the mobile device 100 is slower when the terrain of the user is not flat. In one embodiment, if a user is wearing heels or shoes that are difficult to walk in, the user will take smaller, slower strides to adjust to walking in uncomfortable shoes in contrast to how a user would walk in sneakers or supportive shoes, for example. As such, in one approach, the set speed of the mobile device 100 is slower when the user is wearing non-supportive shoes or shoes that make it difficult for the user to walk. In any case, the control module 240 identifies, using the sensor data 250 of the one or more sensors 120, the gait of the user. Accordingly, the control module 240 determines the signature of the user based on the gait of the user.

Further, the signature of the user, in one or more arrangements, is based, at least in part on, the heart rate and blood oxygen level of the user. The heart rate and blood oxygen level of the user may correspond to movements about the user. For example, based on the heart rate and blood oxygen level of the user, the control module 240 determines how quickly the user is moving. If the heart rate and blood oxygen level of the user is within a range indicating that the user is walking (e.g., 100-145 beats per minute and 95-100% blood oxygen level), the control module 240 determines that the user is walking and sets the speed of the mobile device 100 to follow a user who is walking. Accordingly, the control module 240 determines the signature of the user based on a heart rate and blood oxygen level of the user.

At 420, the control module 240 determines whether the signature of the user satisfies a trigger. In one arrangement, responsive to determining that the signature satisfies a trigger, the control module 240 adjusts a speed of the mobile device 100 by controlling the motor 110 as discussed at block 430. Otherwise, if the signature does not satisfy the trigger, the mobile device 100 continues to travel at the speed it is travelling at as discussed at block 410. In one embodiment, the trigger is identified from a group including a speed of the user, a gait of the user, a presence of an obstacle, adverse weather, a speed limit, and a biometric signal of the user. The biometric signal of the user is at least one of a heart rate, an EKG or ECG signal, and a blood oxygen level of the user. The trigger, in one approach, is satisfied when the speed of the user changes, the gait of the user changes, an obstacle is present in the path of the user, adverse weather is present in the environment of the user, a speed limit restricts the speed the mobile device 100 should be travelling at, and/or if a biometric signal of the user changes.

Accordingly, when the control module 240 determines that the sensor data 250 corresponding to a biometric signal of the user changes, the control module 240 adjusts the speed of the mobile device 100 by controlling the motor 110. The mobile device 100 may communicate with devices, such as a mobile phone or a wearable device (e.g., a smart watch), to receive the biometric signal of the user by establishing a wireless communication link or Bluetooth connection with the devices. In one approach, the control module 240 determines whether an existing wireless connection exists between the mobile device 100 and a second device by identifying and testing an existing wireless connection. The control module 240 may test the wireless connection by sending a secured message over the wireless connection to the device it wants to communicate with. As such, the control module 240 determines that a wireless connection exists if the second device receives the secured message.

If a wireless connection does not exist between the mobile device 100 and the second device, the control module 240 establishes a wireless connection between the mobile device 100 and the second device. For example, the control module 240 may establish the wireless connection by using a handshake process. The handshake process includes the control module 240 identifying a beacon transmitted from the second device and subsequently sending a secured message receivable by the second device. In any case, when a wireless connection is established, the control module 240, in one embodiment, receives sensor data 250 from the second device, where the second device includes a heart rate, an EKG or ECG signal, and/or a blood oxygen level of the user. For example, when the second device is a smart watch, the control module 240 receives sensor data 250 about the heart rate, EKG or ECG signal, and blood oxygen level of the user via the wireless connection between the mobile device 100 and the smart watch.

Additionally, the control module 240 may determine whether the signature satisfies a trigger by comparing the signature of the user to user-specific data about the user. In one approach, the database 230 stores a user profile for a user, where the user profile contains at least one of baseline biometric data, baseline speed data, and baseline gait data about the user. In one arrangement, a user may select the user profile corresponding to the user before the user begins operating the mobile device 100. As such, once the user selects the user profile, the mobile device 100 is preset for the particular user when the user operates the mobile device 100. In one embodiment, the control module 240 identifies the user based on sensor data from the sensors 120 about the user. For example, the control module 240 may identify the user based on the unique gait of the user.

The baseline biometric data may include a normal walking and resting heart rate and blood oxygen level for the user, the baseline speed data may include an average walking speed of the user, and the baseline gait data may include data pertaining to the walking habits of the user (e.g., how wide the steps of the user typically are). In one embodiment, the baseline heart rate, blood oxygen level, and speed data of the user can be extrapolated from a wearable device of the user, such as a smart watch. In one arrangement, the system determines that the signature of the user satisfies the trigger when the signature of the user deviates from the at least one of the baseline biometric data, the baseline speed data, and the baseline gait data about the user according to a defined threshold.

The defined threshold is, in one approach, a level of change in the speed, biometric data, and gait of the user that corresponds to the control module 240 adjusting the speed of the mobile device 100. For example, the defined threshold for the baseline heart rate, EKG, and ECG may be plus or minus 5 beats per minute, 10 beats per minute, or any other range of heart rates that correspond to the user continuing to move at the same speed despite a change in heart rate, EKG, or ECG. The defined threshold for the baseline blood oxygen level is, in one arrangement plus or minus 1%, 2%, etc., that correspond to the user continuing to move at the same speed despite a change in the blood oxygen level. The defined threshold for the speed of the user may be, for example, plus or minus 0.1 miles per hour (mph), 0.2 mph, etc., that corresponds to the user generally walking at the same speed despite a slight change in speed of the user. The defined threshold for the gait of the user is, in one or more embodiments, a stride length of the user (e.g., 10 inches per stride, 11 inches per stride, etc.) that corresponds to the user generally moving at the same speed despite a change in the stride of the user. The mobile device 100 may have preset thresholds for the user to choose from, the user may define the thresholds, or the database 230 may collect data about the movement of the user which allows the control module 240 to determine reasonable thresholds for the user. In any case, when the signature of the user deviates from the baseline data about the user according to a defined threshold, the control module 240 determines that the signature of the user satisfies the trigger.

At 430, the control module 240 adjusts the speed of the mobile device 100 when the signature of the user satisfies the trigger. In one embodiment, an increase in heart rate, irregularities in heart rate, and decrease in blood oxygen level satisfy the trigger. Accordingly, the control module decreases the speed of the mobile device 100 by controlling the motor 110 to lower its RPM when the heart rate of the user increases, the EKG or ECG signal indicates the heart rate of the user increasing, the blood oxygen level of the user decreases, and/or when irregularities in the heart rate of the user (e.g., arrhythmia) is present. For example, if a user has a sudden increase in heart rate or irregularities in heart rate as the user walks, this may indicate that the user is getting tired from the pace at which they are walking, from walking in general, or experiencing arrhythmia. As such, the user is likely to slow down. Accordingly, the control module 240 slows down the mobile device 100 to accommodate to the actions of the user as indicated by the heart rate. In one approach, if a user experiences a lower blood oxygen level, it may indicate that the user is having trouble breathing or having difficulty receiving the proper levels of oxygen as they walk, and as such, the user is likely to slow down. Accordingly, in response to the user's blood oxygen level decreasing, the control module 240 slows down the mobile device 100.

In one embodiment, when the heart rate of the user slows down or the blood oxygen level of the user increases to a normal range after the control module 240 has decreased the speed of the mobile device 100, the change in the biometric signal of the user satisfies the trigger. As such, in response to the user's biometric signals falling back within a normal range, the control module 240 increases the speed of the mobile device 100 to follow the user. In any case, a change in the biometric signal of the user results in the control module 240 adjusting the speed of the mobile device 100 to accommodate to the biometric signal of the user.

In addition to adjusting the speed of the mobile device 100 in response to a change in the biometric signal of the user, the control module 240 adjusts the speed of the mobile device based on the aforementioned triggers being satisfied. In one configuration, a change in the speed of the user satisfies the trigger. In one arrangement, the control module 240 adjusts the speed of the mobile device 100 in proportion to the speed of the user. In one embodiment, the control module 240 analyzes the sensor data 250 to determine the speed of the user, and if the user begins walking faster, the control module 240 causes the motor 110 of the mobile device 100 to increase its RPM to increase the speed of the mobile device 100 to the same degree as the user increased speed. If the user begins walking at a slower speed, the control module 240 causes the motor 110 of the mobile device 100 to decrease its RPM to decrease the speed of the mobile device 100 to the same degree as the user decreased speed.

In one approach, a change in the gait of the user satisfies the trigger, and as such, the control module 240 adjusts the speed of the mobile device 100 in response to a change in the gait of the user. For example, if the user begins taking longer strides that allows the user to cover more ground than when the user usually walks, the control module 240 causes the mobile device 100 to increase its speed by increasing the RPM of the motor 110. Further, if the user enters an area at a location that includes hills or that has unstable terrain, the control module 240 causes the mobile device 100 to decrease its speed by decreasing the RPM of the motor 110.

In one embodiment, an obstacle in the path of the user satisfies the trigger, and as such, the control module 240 adjusts the speed of the mobile device 100 in response to receiving sensor data 250 that indicates an obstacle is present in the path of the user. An obstacle is any obstruction in the path of the mobile device 100 and/or the user, such as other people, objects, spills, animals, etc. that cause the user to adjust how they walk (e.g., adjust their speed, change where they are walking, etc.). For example, if the mobile device 100 and the user approach an aisle of a grocery store where a spill has occurred, the user will likely slow down to avoid slipping and falling. As such, when the sensor data 250 indicates an obstacle, such as a spill, ahead of the user, the control module 240 causes the mobile device 100 to slow down by decreasing the RPM of the motor 110. In one arrangement, the control module 240 adjusts the speed of the mobile device 100 in response to receiving sensor data 250 that indicates adverse weather in the path of the user. For example, if it is snowing or icy, a user may decide to walk slower to avoid slipping. Accordingly, when the sensor data 250 indicates snow is present in the path of the user, the control module 240 causes the mobile device 100 to slow down by decreasing the RPM of the motor 110.

In one embodiment, a speed limit satisfies the trigger, and as such, the control module 240 adjusts the speed of the mobile device 100 to conform with a speed limit of a given location. In one approach, the control module 240 requests speed limit information over a wireless communication link from a system of a location that the mobile device 100 enters by sending a message to the system. If the system receives the message and has speed limit data to give to the mobile device 100, the control module 240 receives speed limit information, and the control module 240 determines whether the mobile device 100 is travelling within the restrictions of the speed limit. If the control module 240 determines that the mobile device 100 is travelling faster than the speed limit of the location, in one arrangement, the control module 240 causes the mobile device 100 to slow down by decreasing the RPM of the motor 110. If, however, the mobile device 100 is travelling at or below the speed limit of the location, or if the location does not have a speed limit, the mobile device 100 continues to travel as it normally would by following a user according to the signature of the user.

Moreover, changes in user-specific signals satisfies the trigger. In one approach, when the user's baseline heart rate and blood oxygen level are stored in the user profile, if the heart rate of the user is faster than the defined threshold for the stored baseline walking heart rate of the user, the trigger is satisfied. Accordingly, the control module 240 causes the mobile device 100 to slow down by decreasing the RPM of the motor 110. In one configuration, when the user's baseline gait is stored in the user profile, if the gait of the user is different than the baseline gait of the user (i.e., the gait satisfies the defined threshold for the gait of the user), the trigger is satisfied. Accordingly, the control module 240 may determine that the change in gait is due to the shoe type of the user, the location of the user, and/or the terrain of the user. As such, the control module 240 adjusts the speed of the mobile device 100 by increasing or decreasing the RPM of the motor 110 according to the current gait of the user. In one embodiment, the control module 240 updates the baseline gait data of the user to include the baseline gait of the user when the user is wearing a specific pair of shoes, in a specific location, and at a specific terrain. In one arrangement, when the user's baseline walking speed is stored in the user profile, if the speed of the user satisfies the threshold for the baseline speed of the user, the control module 240 determines that the trigger is satisfied. When the user's speed deviates from the baseline speed, the control module 240 adjusts the speed of the mobile device 100 by increasing or decreasing the RPM of the motor 110.

In any case, when the signature satisfies the trigger, the control module 240 adjusts the speed of the mobile device 100. In this way, the mobile device 100 improves systems and methods for assisting a user by adjusting a speed of the mobile device 100 in response to a signature about the user satisfying a trigger.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A mobile device for assisting a user, comprising:
   a motor;
   one or more sensors;
   a processor; and
   a memory communicably coupled to the processor and including instructions that, when executed by the processor, cause the processor to:
   determine, using sensor data from the one or more sensors, a signature of the user that is operating the mobile device, the signature indicating at least attributes about movement of the user relating to a gait including a walking habit that specifies at least a width of steps and physiological attributes including a heart rate; and
   responsive to determining that the signature satisfies a trigger that indicates a deviation in the signature, including identifying a change in the width of the steps of the gait, and a change in the physiological attributes including an increase in the heart rate of the user, adjust a speed of the mobile device in proportion to a speed of the user and the heart rate by controlling the motor, wherein the instructions to identify the deviation include instructions to compare baseline gait data with the signature to determine the deviation.

2. The mobile device of claim 1, wherein the trigger is identified from a group including: a speed of the user, a gait of the user, a presence of an obstacle, adverse weather, a speed limit, and a biometric signal of the user, wherein the biometric signal of the user is at least one of: the heart rate and a blood oxygen level, and
   wherein the instructions to adjust the speed of the mobile device include instructions to maintain a predetermined distance between the mobile device and the user.

3. The mobile device of claim 2, wherein the instructions to determine the signature of the user include instructions to extrapolate the biometric signal of the user from a wearable device.

4. The mobile device of claim 2, wherein the instructions to adjust the speed of the mobile device include instructions to decrease the speed in response to at least one of: the heart rate of the user increasing, the blood oxygen level of the user decreasing, and irregularities in the heart rate of the user.

5. The mobile device of claim 1, wherein the instructions further include instructions to control the mobile device to follow a path derived from at least one of: a manual input, a cloud-based map, and a path of the user.

6. The mobile device of claim 1, wherein the instructions to determine the signature of the user include instructions to determine the gait of the user, wherein the gait of the user depends, at least in part on, a height of the user, an age of the user, and an environment of the user, the environment including a terrain, shoes of the user, and a location of the user.

7. The mobile device of claim 1, wherein the mobile device further comprises a user profile for the user, and wherein the user profile contains at least one of: baseline biometric data, baseline speed data, and the baseline gait data about the user.

8. The mobile device of claim 7, wherein the instructions to determine that the signature satisfies the trigger include instructions to determine that the signature of the user deviates from the at least one of: the baseline biometric data, the baseline speed data, and the baseline gait data about the user.

9. The mobile device of claim 1, wherein determining, using the sensor data of the one or more sensors, the signature of the user includes using the sensor data to identify at least attributes about the movement of the user, and
   wherein the attributes about the movement of the user include at least a speed of the user, a gait of the user, a heart rate of the user, and a blood oxygen level of the user.

* * * * *